United States Patent
Falcon

(10) Patent No.: US 11,537,357 B2
(45) Date of Patent: Dec. 27, 2022

(54) MEDIA CONTEXT SWITCHING BETWEEN DEVICES USING WIRELESS COMMUNICATIONS CHANNELS

(71) Applicant: Spotify AB, Stockholm (SE)

(72) Inventor: Jose Falcon, Brooklyn, NY (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/112,819

(22) Filed: Dec. 4, 2020

(65) Prior Publication Data

US 2021/0149622 A1 May 20, 2021

Related U.S. Application Data

(63) Continuation of application No. 16/506,925, filed on Jul. 9, 2019, now Pat. No. 10,884,697, which is a continuation of application No. 14/983,317, filed on Dec. 29, 2015, now Pat. No. 10,348,790.

(60) Provisional application No. 62/271,181, filed on Dec. 22, 2015.

(51) Int. Cl.
*G06F 3/16* (2006.01)
*H04W 4/80* (2018.01)
*H04L 65/1083* (2022.01)
*H04L 65/401* (2022.01)
*H04W 12/084* (2021.01)

(52) U.S. Cl.
CPC .......... *G06F 3/165* (2013.01); *H04L 65/1083* (2013.01); *H04L 65/4015* (2013.01); *H04W 4/80* (2018.02); *H04W 12/084* (2021.01)

(58) Field of Classification Search
CPC . G06F 3/165; H04L 65/1083; H04L 65/4015; H04W 4/80; H04W 12/084
See application file for complete search history.

(56) References Cited

U.S. PATENT DOCUMENTS

| | | | |
|---|---|---|---|
| 9,432,429 B1 * | 8/2016 | Ho | H04L 65/604 |
| 2008/0209021 A1 | 8/2008 | Shamma | |
| 2009/0215435 A1 | 8/2009 | de Leon et al. | |
| 2013/0054697 A1 | 2/2013 | Cha | |

(Continued)

OTHER PUBLICATIONS

Chloe Albanesius, Google Buys Bump App for Easy Sharing, Sep. 16, 2013, PCMag, 3 pages.

(Continued)

*Primary Examiner* — Nicholas R Taylor
*Assistant Examiner* — Sanjoy K Roy
(74) *Attorney, Agent, or Firm* — Morgan, Lewis & Bockius LLP

(57) ABSTRACT

Methods, systems, and/or devices for media context switching among electronic devices are described herein. In one aspect, a method is performed at a first electronic device. A first media item is played. While playing the first media item, a near-field-communication (NFC) channel is established with a second electronic device while the second electronic device is playing a second media item. First contextual data of the first electronic device is transferred via the NFC channel to the second electronic device, wherein the first contextual data corresponds to the first media item. A playback command for the second media item is received. In response to receiving the playback command for the second media item, the first electronic device plays the second media item.

21 Claims, 9 Drawing Sheets

(56) References Cited

U.S. PATENT DOCUMENTS

| | | | |
|---|---|---|---|
| 2013/0073584 | A1 | 3/2013 | Kuper et al. |
| 2013/0268593 | A1* | 10/2013 | Parekh ................ G06Q 30/0631 709/204 |
| 2013/0346478 | A1 | 12/2013 | Rodriguez et al. |
| 2014/0105561 | A1 | 4/2014 | Chen et al. |
| 2015/0094834 | A1 | 4/2015 | Vega et al. |
| 2015/0355878 | A1* | 12/2015 | Corbin .................... G06F 16/64 700/94 |
| 2016/0087928 | A1* | 3/2016 | Soldner .................. H04L 51/10 709/206 |
| 2016/0162252 | A1* | 6/2016 | Di Censo ................ G11B 27/11 700/94 |
| 2016/0174180 | A1* | 6/2016 | Daley ............... H04W 56/0015 455/3.06 |
| 2017/0093943 | A1 | 3/2017 | Alsina et al. |
| 2017/0273044 | A1* | 9/2017 | Alsina .................... H04L 65/60 |

OTHER PUBLICATIONS

Falcon, Office Action, U.S. Appl. No. 14/983,317, dated Dec. 18, 2017, 23 pgs.
Falcon, Final Office Action, U.S. Appl. No. 14/983,317, dated Jul. 17, 2018, 22 pgs.
Falcon, Office Action, U.S. Appl. No. 14/983,317, dated Nov. 2, 2018, 22 pgs.
Falcon, Notice of Allowance, U.S. Appl. No. 14/983,317, dated Feb. 21, 2019, 9 pgs.
Sarah Perez, With Its Latest Update, Bump's Mobile App Replaces USB Flash Drives, Feb. 14, 2013, Tech Crunch, 7 pages.
Daniel Terdiman, With Bump Pay, sending money is easier than ever, Mar. 29, 2012, CNET, 4 pages.
Falcon, Office Action, U.S. Appl. No. 16/506,925, dated Jun. 1, 2020, 23 pgs.
Falcon, Notice of Allowance, U.S. Appl. No. 16/506,925, dated Sep. 10, 2020, 7 pgs.

* cited by examiner

MEDIA CONTEXT SWITCHING BETWEEN DEVICES USING WIRELESS COMMUNICATIONS CHANNELS

RELATED APPLICATION

This application is a continuation of U.S. Non-Provisional application Ser. No. 16/506,925, filed Jul. 9, 2019, which is a continuation of U.S. Non-Provisional application Ser. No. 14/983,317, filed Dec. 29, 2015, and claims priority and benefit to U.S. Provisional Application No. 62/271,181, filed Dec. 22, 2015, each of which is hereby incorporated by reference in its entirety.

TECHNICAL FIELD

The disclosed implementations relate generally to media playback, and, in particular, to using wireless communications channels for media context switching between devices.

BACKGROUND

Given the expansive and ever-growing amount of media available to consumers, users may wish to share and exchange media content with each other. While the details of media content may be verbally or visually exchanged between users, multiple steps are typically required in order for users to access and experience shared media content. For example, in order to listen to a recommended music track, a user would typically need to enter details of the music track in a search engine. Assuming the content is available, the user would then need to select the track in order to listen. The process is further encumbered if the user wishes to listen only to a specific portion of the music track that was recommended, as the user might need to skip over parts of the track until the relevant portion is accessed.

SUMMARY

Accordingly, there is a need for devices, systems, and methods for switching playback contexts between electronic devices in order to share media content playing on the electronic devices. Using a near-field-communications (NFC) channel or other wireless channel, contextual data may be transferred between electronic devices, specifying media items, such as music tracks, being played on respective electronic devices. Thereafter, each of the electronic devices receive playback commands based on the contextual data of the other, causing each of the electronic devices to play a media item that was previously playing on the other electronic device before the contextual data was transferred. Users are therefore able to more efficiently, effectively, and securely share media content with other users. Such devices, systems, and methods optionally complement or replace conventional methods for sharing media content.

In accordance with some implementations, a method is performed at a first electronic device (e.g., a first smart phone) having one or more processors and memory storing instructions for execution by the one or more processors. The method includes playing a first media item. While playing the first media item, a near-field-communication (NFC) channel is established with a second electronic device (e.g., a second smart phone) while the second electronic device is playing a second media item. First contextual data of the first electronic device is transferred via the NFC channel to the second electronic device, wherein the first contextual data corresponds to the first media item. A playback command for the second media item is received. In response to receiving the playback command for the second media item, the first electronic device plays the second media item.

In accordance with some implementations, a method is performed at a first electronic device (e.g., a first smart phone) having one or more processors and memory storing instructions for execution by the one or more processors. The method includes the first electronic device playing a first media item, wherein first contextual data of the first electronic device specifies the first media item. While playing the first media item, an NFC channel is established with a second electronic device (e.g., a second smart phone) while the second electronic device is playing a second media item, wherein second contextual data of the second electronic device corresponds to the second media item. The first electronic device receives the second contextual data via the NFC channel from the second electronic device. After receiving the second contextual data, the first electronic device receives a playback command for the second media item. In response to receiving the playback command for the second media item, the first electronic device plays the second media item.

In accordance with some implementations, a method is performed at a remote server system (e.g., a media content server) having one or more processors and memory storing instructions for execution by the one or more processors. The remote server system receives, from a first electronic device (e.g., a first smart phone), first contextual data of the first electronic device and second contextual data of a second electronic device (e.g., a second smart phone). The first contextual data specifies a first media item playing on the first electronic device and the second contextual data specifies a second media item playing on the second electronic device. The remote server system sends a first playback command for the second media item to the first electronic device in accordance with the second contextual data, and sends a second playback command for the first media item to the second electronic device in accordance with the first contextual data.

In accordance with some implementations, an electronic device includes one or more processors and memory storing one or more programs configured to be executed by the one or more processors. The one or more programs include instructions for performing the operations of any of the methods described above. In accordance with some implementations, a non-transitory computer-readable storage medium has stored therein instructions that, when executed by the electronic device, cause the electronic device to perform the operations of any of the methods described above.

Thus, devices are provided with efficient methods for sharing media content among one another, thereby increasing the effectiveness, efficiency, and user satisfaction with such devices.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
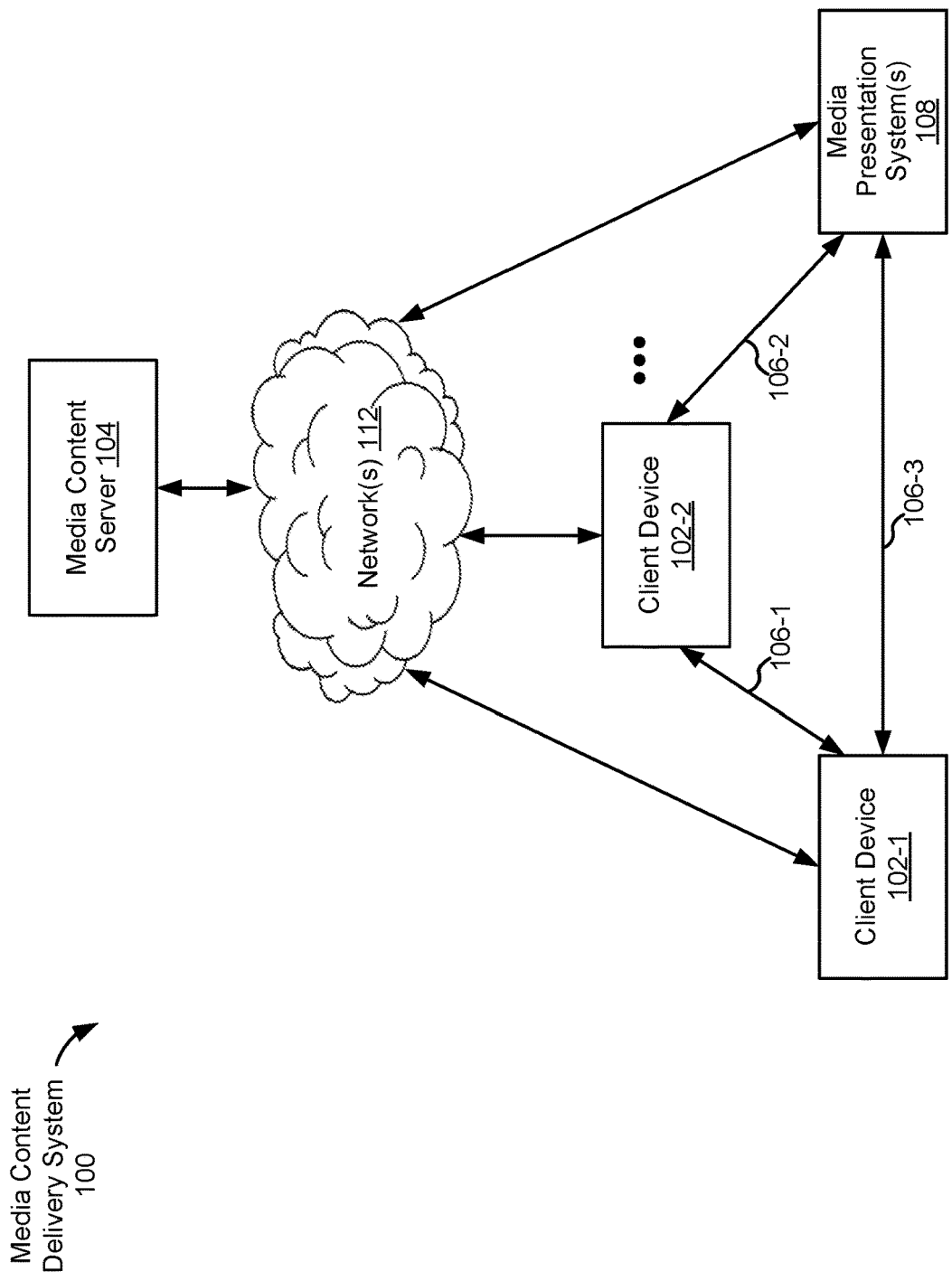
FIG. 1 is a block diagram illustrating an exemplary media content delivery system in accordance with some implementations.

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not the same electronic device.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

FIG. 1 is a block diagram illustrating an exemplary media content delivery system 100 in accordance with some implementations. The media content delivery system 100 includes one or more client devices 102 (e.g., client device 102-1 and client device 102-2), one or more media content servers (e.g., media content server 104), and one or more media presentation systems (e.g., media presentation systems 108, which may include a speaker, television (TV), digital versatile disk (DVD), and/or other media presentation system). One or more networks (e.g., network(s) 112) communicably connect each component of the media content delivery system 100 with other components of the media content delivery system 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some implementations, a client device (e.g. client device 102-1 or client device 102-2) is a representative electronic device associated with one or more users. In some implementations, a client device is any of: a personal computer, a mobile electronic device, a wearable computing device, a laptop, a tablet computer, a mobile phone, a feature phone, a smart phone, a digital media player, or any other electronic device capable of executing commands for playing media content. In some implementations, client device 102-1 and client device 102-2 are the same type of device (e.g., client device 102-1 and client device 102-2 are both mobile devices). Alternatively, client device 102-1 and client device 102-2 are different types of devices.

In some implementations, client devices 102-1 and 102-2 send and receive information through the networks 112. For example, through the networks 112, client devices 102 may send data to the media content server 104 (e.g., contextual data, indicating a track currently playing on a respective client device 102) and receive playback commands that cause corresponding media items (e.g., music tracks, videos, etc.) to be played. In some implementations, client devices 102 are associated with identifiers (e.g., unique hardware or application identifiers, network addresses, etc.) that the media content server 104 uses to uniquely identify and/or establish communications with the client devices 102. In some implementations, the media presentation system(s) 108 may be part of the client devices 102, such as built-in speakers, an audio jack, or a screen, or may be separate from the client devices 102, such as a wirelessly coupled speaker.

Client devices 102 (and optionally, the media presentation system 108) communicate with each other through one or more communications channels. In some implementations, client devices 102 communicate with each other through the one or more network(s) 112. For example, if the client devices 102 initiate a process for media context switching (e.g., swapping tracks), the client device 102-1 may send contextual data for a media item that it is currently playing to the media content server 104, and in response, a playback command is sent to the client device 102-2 that causes the media item to play on the client device 102-2. In some implementations, client devices 102 (and optionally, the media presentation system 108) communicate with each other directly through one or more wired and/or wireless communications channels 106 (e.g., BLUETOOTH/BLE communication technologies, radio-frequency-based near-field-communication (NFC) technologies, infrared communication technologies, etc.). For example (as described in greater detail below), client devices 102 may include a wireless communications interface (e.g., an NFC interface)

for establishing wireless communications channels 106 (e.g., NFC channels) with one another when they are within a threshold proximity of each other. Contextual data of respective media items playing on the client devices 102 may be transferred via the wireless communications channels to perform media context switching (e.g., to swap tracks).

Figure 2:
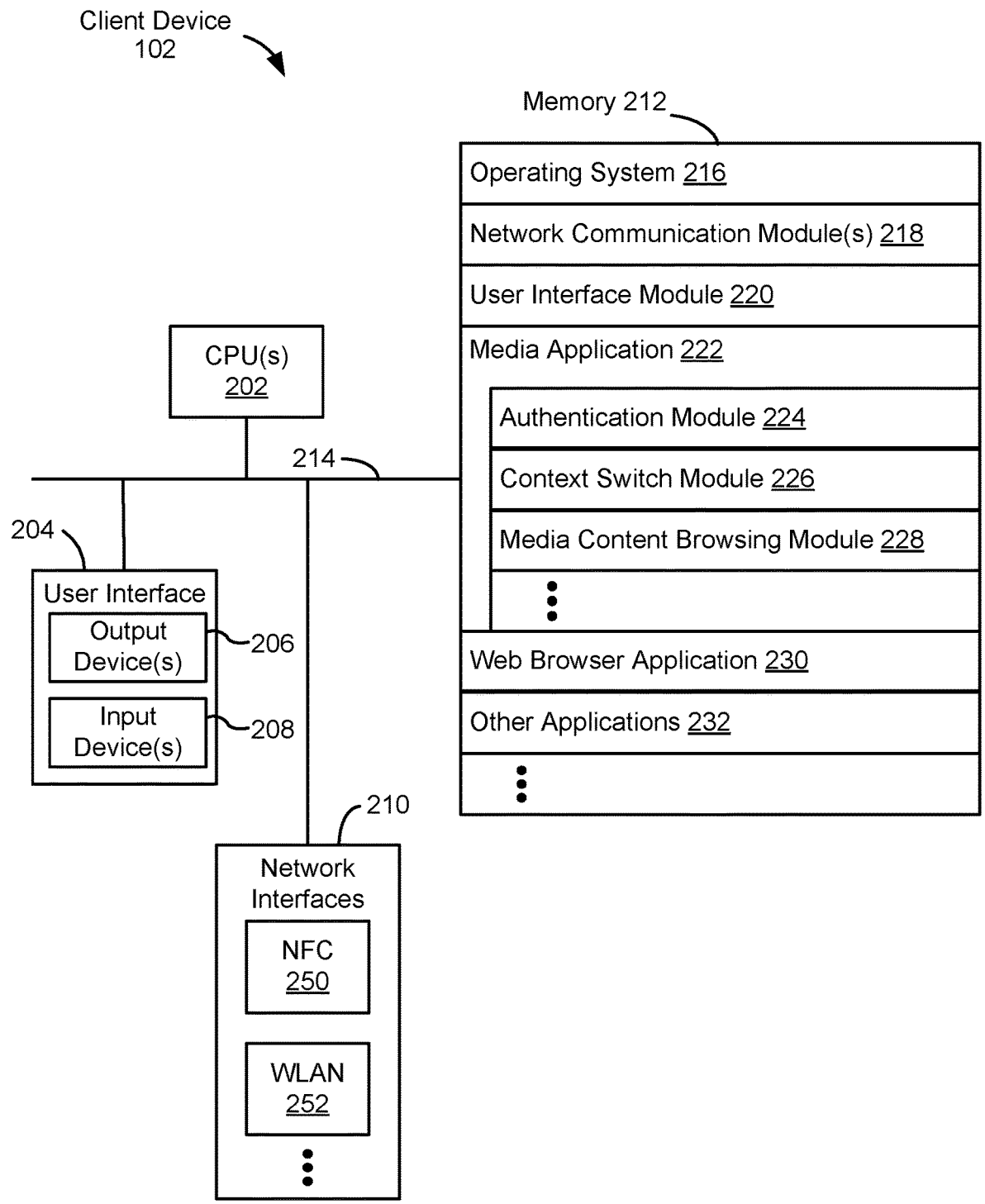
FIG. 2 is a block diagram illustrating an exemplary client device in accordance with some implementations.

In some implementations, client device 102-1 and client device 102-2 each include a media application 222 (as shown in FIG. 2 and described in more detail below) that allows a user of the client device to browse and request playback of media content. Using the media application 222, in some implementations, client devices 102 may also initiate a media context switching process (e.g., context switch module 226). As an example, when the client devices 102 (or a client device 102 and the media presentation system 108) are brought within a threshold proximity of one another, an affordance (e.g., affordance 410, FIG. 4C) is displayed on one or both of the client devices 102. Selection of the affordance initiates a media context switching process where contextual data is transferred between the client devices and playback commands are received by the client devices, causing corresponding media items to be played (e.g., causing tracks to be swapped).

In some implementations, the media content server 104 stores media content and provides the media content (e.g., in response to receiving contextual data from the client device 102-1 and/or 102-2), via the network(s) 112, to the client devices 102 and/or the media presentation system 108. Content stored and served by the media content server 104, in some implementations, includes any appropriate content, including text (e.g., audio (e.g., music, spoken word, podcasts, etc.), videos (e.g., short-form videos, music videos, television shows, movies, clips, previews, etc.), articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). In some implementations (e.g., as described for FIG. 5), contextual data (e.g., transferred between client devices 102 during a media context switching process) specifies media items in playback on respective devices, where the media items correspond to media content stored in the media content server 104. For example, the contextual data includes a media-item identifier, a time marker, and/or a device identifier. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some implementations, the media content server 104 is implemented by multiple computing devices working together to perform the actions of a server system (e.g., cloud computing).

Figure 5:
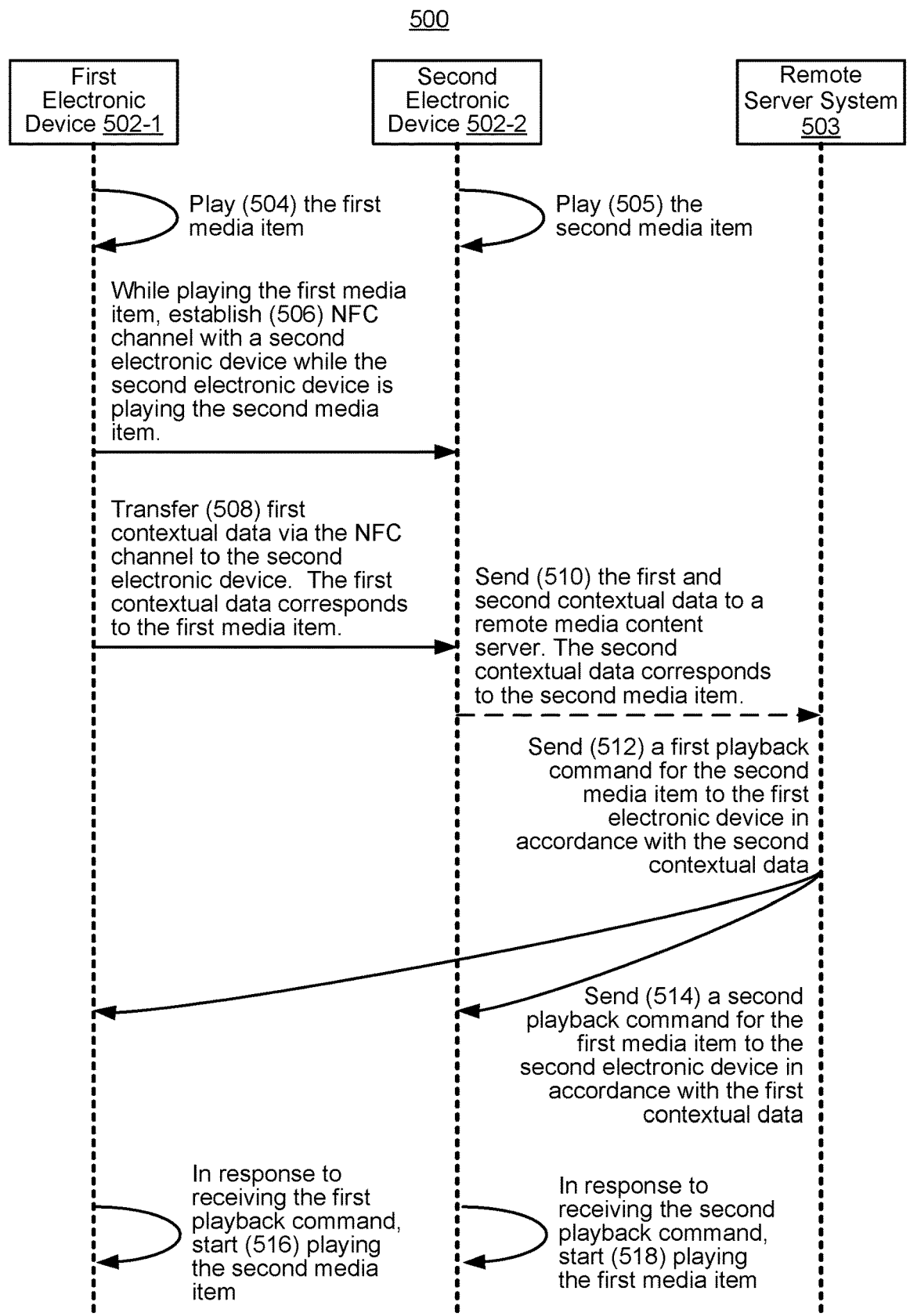
FIG. 5 is a flow diagram illustrating a method of media context switching among electronic devices, in accordance with some implementations.

As described above, media presentation systems 108 are capable of receiving media content (e.g., from the media content server 104) and presenting the received media content. In some implementations, media presentation systems are thus devices to which the media content server 104 can send media content. For example, media presentation systems include computers, dedicated media players, home entertainment systems, network-connected stereo and/or speaker systems, network-connected vehicle media systems, network-connected televisions, network-connected DVD players, and universal serial bus (USB) devices used to provide a playback device with network connectivity, and the like. In some implementations, each media presentation system 108 is associated with an identifier (e.g., a unique hardware or application identifier, a network address, etc.) that the media content server 104 and/or the client devices 102 use to uniquely identify and/or establish communications with the media presentation system. In some implementations, a media presentation system 108 receives from client devices 102 (e.g., using an NFC channel) contextual data for respective media items playing on the client devices 102. The media presentation system 108 sends the contextual data (e.g., via a network 112) to the media content server 104, and afterwards receives a playback command from the media content server 104 that causes playback of the respective media items (e.g., media items queued in an order in which the contextual data was received from the client devices 102). In these implementations, users may therefore perform media context switching with the media presentation system 108 by using client devices 102, as described in greater detail with respect to the method 500 (FIG. 5). In some implementations, media presentation systems 108 are integrated into respective client devices 102.

FIG. 2 is a block diagram illustrating an exemplary client device 102 (e.g., client device 102-1 and/or client device 102-2 of FIG. 1) in accordance with some implementations. The client device 102 typically includes one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

As also shown in FIG. 2, the client device 102 includes a user interface 204, including output device(s) 206 and input device(s) 208. In some implementations, the input devices include a keyboard or track pad. Alternatively, or in addition, in some implementations, the user interface 204 includes a display device that includes a touch-sensitive surface, in which case the display device is a touch-sensitive display. In client devices that have a touch-sensitive display, a physical keyboard is optional (e.g., a soft keyboard may be displayed when keyboard entry is needed). The output devices (e.g., output device(s) 206) also optionally include speakers or an audio output connection (i.e., audio jack) connected to speakers, earphones, or headphones. Furthermore, some client devices 102 use a microphone and voice recognition device to supplement or replace the keyboard. Optionally, the client device 102 includes an audio input device (e.g., a microphone) to capture audio (e.g., speech from a user). Optionally, the client device 102 includes a location-detection device, such as a GPS (global positioning satellite) or other geo-location receiver, and/or location-detection software for determining the location of the client device 102.

In some implementations, the one or more network interfaces 210 include wireless and/or wired interfaces for receiving data from and/or transmitting data to other client devices 102, media presentations systems 108, media content server 104, and/or other devices or systems. In some implementations, data communications are carried out using any of a variety of custom or standard wireless protocols (e.g., NFC, RFID, IEEE 802.15.4, Wi-Fi, ZigBee, 6LoW- PAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, the one or more network interfaces 210 include an NFC interface 250 for enabling wireless data communications with other client devices 102, media presentations systems 108, and/or or other NFC-compatible devices. Furthermore, in some implementations, the one or more network interfaces 210 includes a wireless LAN (WLAN) interface 252 for enabling data communications with other WLAN-compatible devices and/or the media content server 104 (via the one or more network(s) 112, FIG. 1).

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some implementations, memory 212 or the non-transitory computer-readable storage medium of memory 212 stores the following programs, modules, and data structures, or a subset or superset thereof:

- an operating system 216 that includes procedures for handling various basic system services and for performing hardware dependent tasks;
- network communication module(s) 218 for connecting the client device 102 to other computing devices (e.g., client devices 102, media presentation systems 108, media content server 104, and/or other devices) via the one or more network interface(s) 210 (wired or wireless);
- a user interface module 220 that receives commands and/or inputs from a user via the user interface 204 (e.g., from the input devices 208, which may include keyboards, touch screens, microphones, eye tracking components, three-dimensional gesture tracking components, and the like), and provides user interface objects and other outputs for display on the user interface 204 (e.g., the output devices 206, which may include a display screen, a touchscreen, a speaker, etc.);
- a media application 222 (e.g., an application associated with a media content provider, including a media player, a streaming media application, or any other appropriate application or component of an application) for browsing, receiving, processing, and presenting media content (e.g., media content streams, media content files, advertisements, web pages, videos, audio, games, etc.). The media application 222 also includes the following modules (or sets of instructions), or a subset or superset thereof:
  - an authentication module 224 for sending authentication tokens corresponding to one or more media presentation systems associated with the client device 102 (e.g., one or more of the media presentation systems 108 from FIG. 1), receiving authentication tokens from other client devices, and optionally generating authentication tokens for media presentation systems associated with client device 102;
  - a context switch module 226 for transferring (e.g., to another client device 102 using NFC), receiving (e.g., from another client device 102 using NFC), and/or sending (e.g., to a media content server 104) contextual data (e.g., data specifying a media item playing on a respective client device 102), and for receiving and executing playback commands for playing media items (e.g., receiving playback commands in response to sending contextual data to the media content server 104);
  - a media content browsing module 228 for providing controls and/or user interfaces enabling a user to navigate, select for playback, and otherwise control or interact with media content, whether the media content is stored locally or remotely;
- a web browser application 230 (e.g., Internet Explorer by Microsoft, Firefox by Mozilla, Safari by Apple, or Chrome by Google) for accessing, viewing, and interacting with web sites; and
- other applications 232, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some implementations, the media presentation systems 108 is a type of client device 102, and includes some or all of the same components, modules, and sub-modules as described above with respect to the client device 102.

Figure 3:
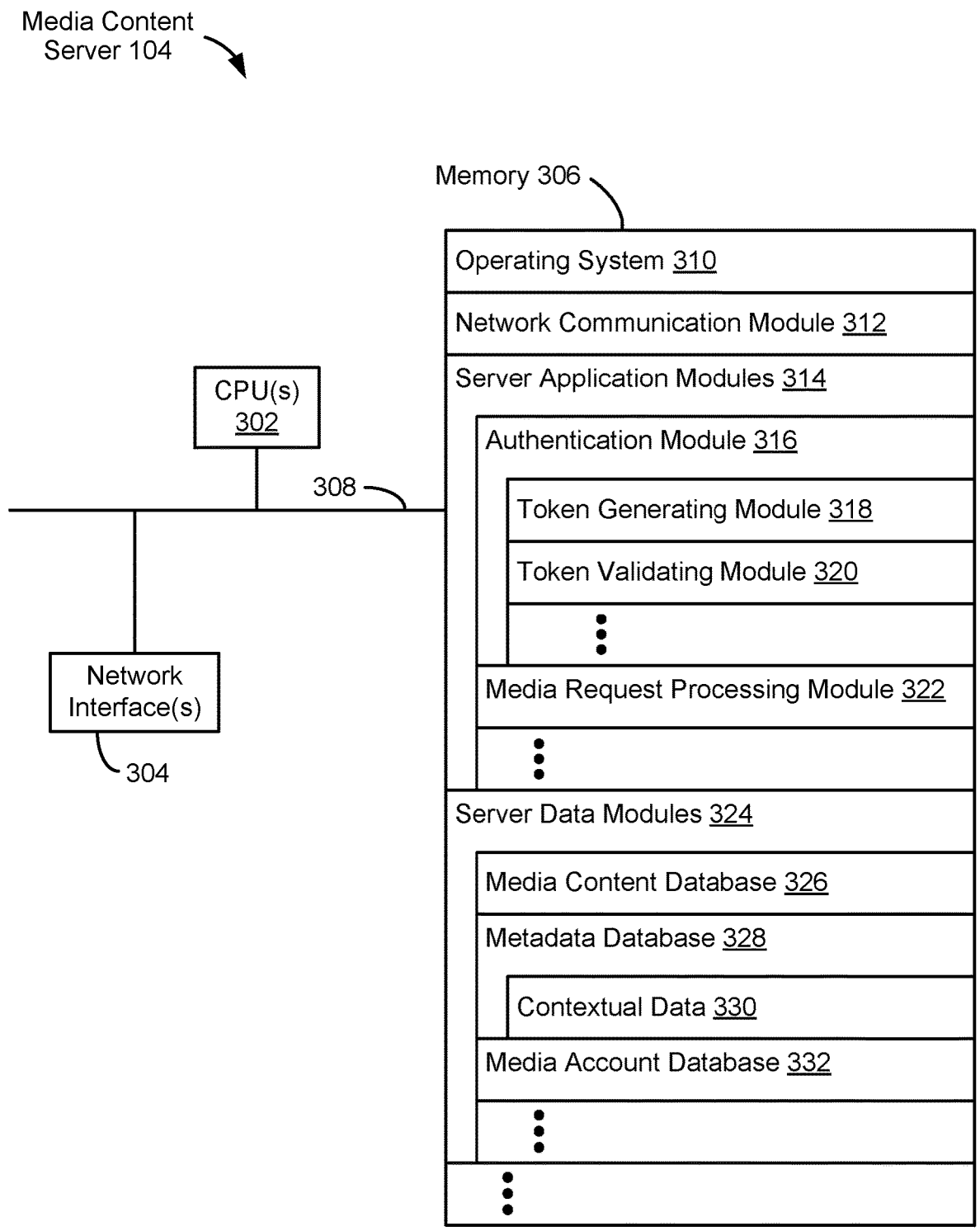
FIG. 3 is a block diagram illustrating an exemplary media content server in accordance with some implementations.

FIG. 3 is a block diagram illustrating an exemplary media content server 104 in accordance with some implementations. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules and data structures, or a subset or superset thereof:

- an operating system 310 that includes procedures for handling various basic system services and for performing hardware dependent tasks;
- a network communication module 312 that is used for connecting the media content server 104 to other computing devices via one or more network interfaces 304 (wired or wireless) connected to one or more networks 112 such as the Internet, other WANs, LANs, PANs, MANs, VPNs, peer-to-peer networks, content delivery networks, ad-hoc connections, and so on;
- one or more server application modules 314 for enabling the media content server 104 to perform various functions, the server application modules 314 including, but not limited to, one or more of:

an authentication module 316 for managing authentication and/or authorization requests, the authentication module 316 including, but not limited to, one or more of:
    a token generating module 318 for generating authentication tokens permitting use of media presentation systems 108 (FIG. 1); and
    a token validating module 320 for verifying that an authentication token is valid (e.g., has not yet expired or has not yet been revoked);
a media request processing module 322 for processing requests for media content and facilitating access to requested media content items by client devices (e.g., the client device 102) including, optionally, streaming media content to such devices or to one or more media presentation systems 108, and sending playback commands for playing media items to client devices 102 and/or media presentation systems 108 (e.g., based on contextual data received from client devices 102); and
one or more server data module(s) 324 for handling the storage of and access to media content items and metadata relating to the media content items; in some implementations, the one or more server data module(s) 324 include:
    a media content database 326 for storing media content items (e.g., audio files, video files, text files, etc.);
    a metadata database 328 for storing metadata relating to the media content items including, but not limited to:
        contextual data 330 that specifies media items being played on client devices 102 and/or media presentation system 108, and other associated information (e.g., contextual data includes a media-item identifier, a time marker, device identifier, etc.); and
    a media account database 332 for storing account information for user media accounts, including user profiles, credentials (e.g., user identifiers, passwords, email addresses, etc.), credentials or identifiers of any linked accounts, and the like.

In some implementations, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some implementations, FIG. 3 is intended more as a functional description of the various features that may be present in one or more media content servers than as a structural schematic of the implementations described herein. In practice, items shown separately could be combined and some items could be separated. For example, some items shown separately in FIG. 3 could be implemented on single servers and single items could be implemented by one or more servers. The actual number of servers used to implement the media content server 104, and how features are allocated among them, will vary from one implementation to another and, optionally, depends in part on the amount of data traffic that the server system handles during peak usage periods as well as during average usage periods.

In some implementations, the media content server 104 uses tables, databases, or other appropriate data structures to associate respective users with respective media presentation systems and to manage authentication tokens (i.e., access tokens) associated with respective media presentation systems.

FIGS. 4A-4E illustrate an interaction between electronic devices in which media context switching is performed, in accordance with some implementations. In this example, the electronic devices are client devices 102. Also shown are implementations of graphical user interfaces ("GUIs") that are displayed on the client devices 102 during a media context switching operation.

Figure 4A:
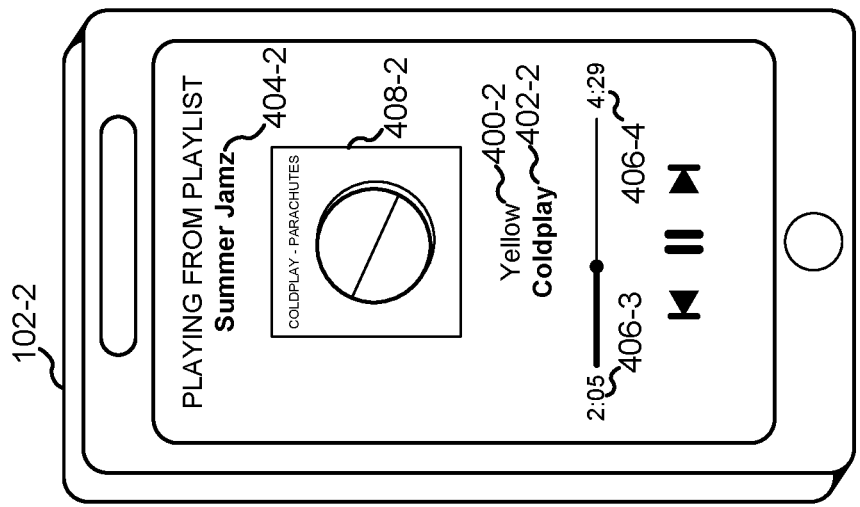
FIGS. 4A-4E illustrate an interaction between electronic devices in which media context switching is performed, in accordance with some implementations.
Figure 4A:
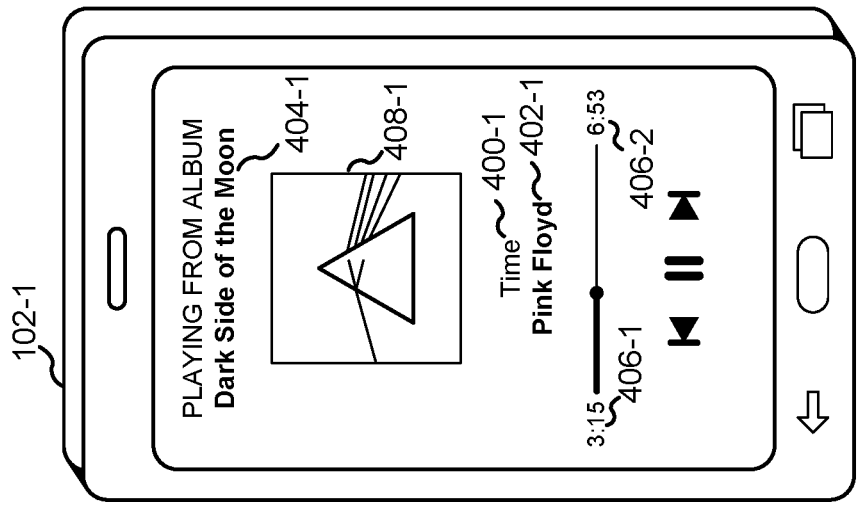

In FIG. 4A, client devices 102-1 and 102-2 are shown separately playing respective media items. The respective GUIs displayed on the client devices 102 visually indicate details of the respective media items playing on the client devices 102, such as a track name (400-1 and 400-2), an artist (402-1 and 402-2), a playback context (404-1 and 404-2) (e.g., album, playlist), time marker information (406-1 through 406-4) (e.g., current position within playback 406-1 and 406-3; length of track 406-2 and 406-4), and an associated graphic (e.g., album covers 408-1 and 408-2).

Figure 4B:
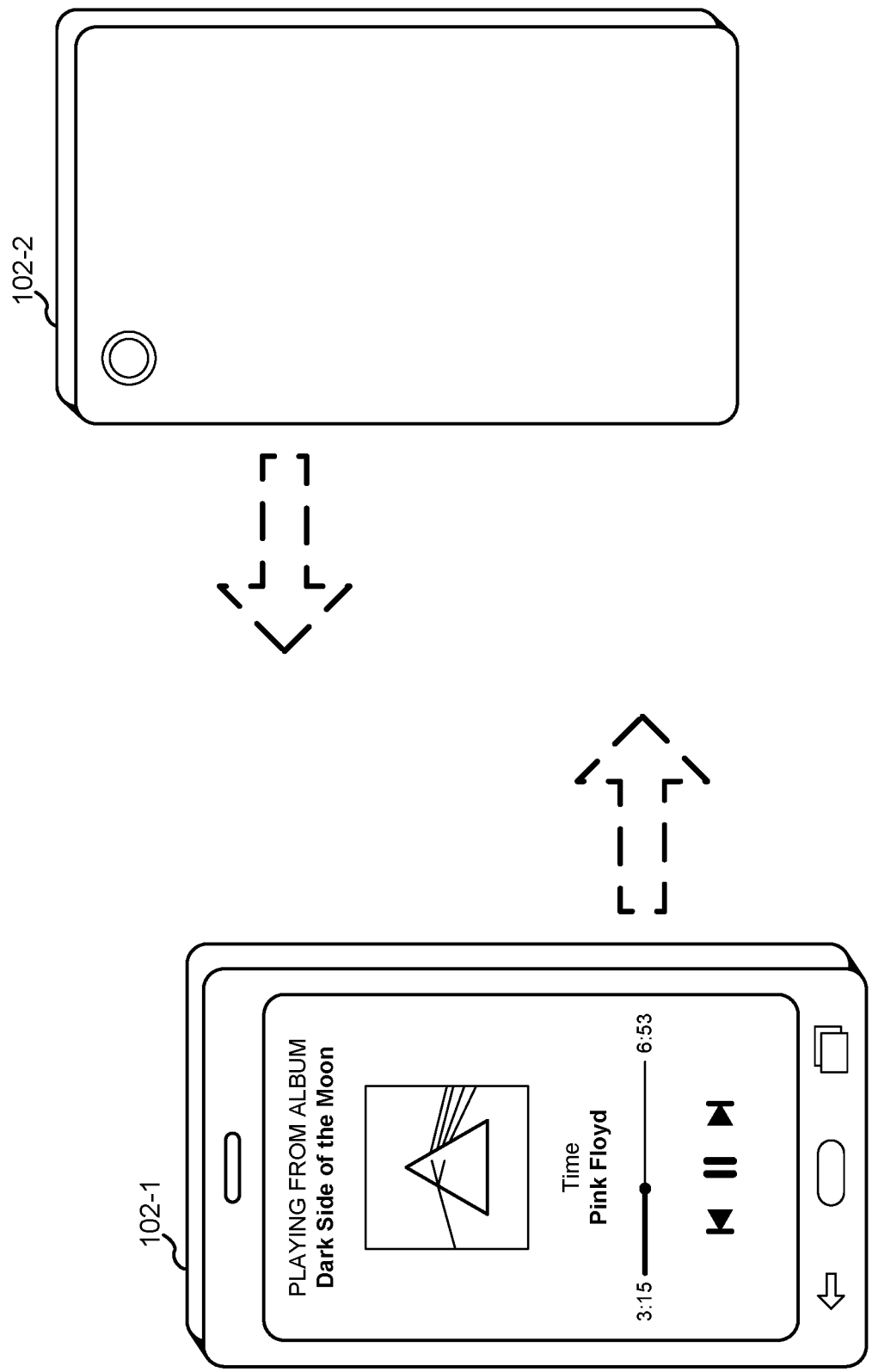

Referring now to FIG. 4B, while playing their respective media items, the client devices 102 are brought towards each other to initiate a transfer of contextual data from at least one client device to the other (e.g., between the two client devices). Contextual data for a respective client device includes data specifying a media item in playback on the respective client device, or associated details thereof. Contextual data specifies, for example, a media-item identifier (e.g., corresponding to track "Yellow" by artist "Coldplay"), a time marker (e.g., corresponding to time 2:05 of track length 4:29), a device identifier (e.g., for client device 102-2), a user identifier (e.g., for a user associated with the client device 102-2), and/or a media-item context (e.g., track playing from a playlist 404-2 entitled "Summer Jamz").

Figure 4C:
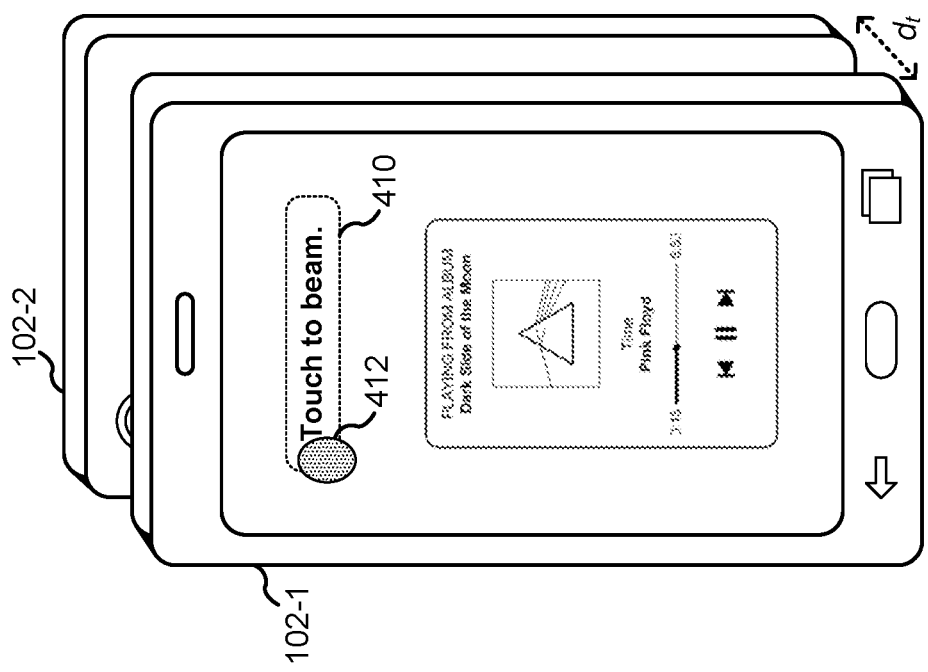

As illustrated in FIG. 4C, the client devices 102 are within a threshold proximity (distance dr) from one other, sufficient for establishing a wireless communications channel (e.g., using near-field-communication (NFC)) through which data can be transferred between the client devices. In this example, an optional affordance 410 appears on the GUI of client device 102-1, requesting confirmation for the client device 102-1 to transfer contextual data to (and/or receive contextual data from) the client device 102-2.

In response to detecting a user input 412 selecting the affordance 410, contextual data for the media item playing on the client device 102-1 is transferred to the client device 102-2. Afterwards, referring to FIGS. 4D and 4E, each client device 102 automatically receives a respective playback command corresponding to the media item that was playing on the other client device 102. Playback commands thus are received without any user input beyond the user input 412 (or alternatively, without any user input at all). As indicated by the displayed GUIs, the client device 102-1 begins playing the media item that was previously playing on the client device 102-2 in FIG. 4A, and similarly the client device 102-2 begins playing the media item that was previously playing on the client device 102-1.

Both client devices 102 switch context in the example of FIGS. 4A-4E. Alternatively, only one of the two devices switches context. FIGS. 4A-4E illustrate context switching that occurs upon bringing the client devices into range of each other. Alternatively, context switching may be delayed until a client devices finishes playing a current media item or play list. The context switching of FIGS. 4A-4E results in each device beginning to play a media item that was being played by the other device when the devices detected each other. Alternatively, context switching may cause a client device to start playback from the beginning of a playlist for the other devices.

Media context switching with client devices 102 as show in FIGS. 4A-4E and described for these other examples is described in greater detail below in conjunction with the method 500 of FIG. 5.

FIG. 5 is a flow diagram illustrating a method 500 of media context switching among electronic devices, in accordance with some implementations. The method 500 is performed by a first electronic device 502-1 (e.g., client device 102-1, FIGS. 1 and 2), a second electronic device 502-2 (e.g., client device 102-2, FIGS. 1 and 2), and a remote server system 503 (e.g., media content server 104, FIGS. 1 and 3). Operations performed in FIG. 5 correspond to instructions stored in computer memories (e.g., memory 212 of client devices 102, FIG. 2, and memory 306 of media content server 104, FIG. 3) or other computer-readable storage medium.

The first electronic device 502-1 plays (504) a first media item, and the second electronic device 502-2 simultaneously plays (505) a second media item. An example is provided in FIG. 4A, where the client device 102-1 is shown playing an audio track 400-1 "Time" by the artist 402-1 "Pink Floyd," and the client device 102-2 is shown playing an audio track 400-2 "Yellow" by the artist 402-2 "Coldplay." In some implementations, the first electronic device 502-1 continues playing the first media item until it begins playing the second media item in response to receiving the first playback command (step 516, described below), and the second electronic device 502-2 continues playing the second media item until it beings playing the first media item in response to receiving the second playback command (step 518, described below).

While playing the first media item, the first electronic device 502-1 establishes (506) a near-field-communication (NFC) channel with a second electronic device 502-2 (and the second electronic device establishes the NFC channel with the first electronic device) while the second electronic device is playing the second media item. In some implementations, the NFC channel is established when the first electronic device 502-1 and the second electronic device 502-2 are detected to be within a threshold proximity of one another (e.g., a threshold distance for the NFC interface of the electronic devices). An example is shown in FIG. 4C, where the client devices 102 establish an NFC channel when they are within a threshold distance $d_t$ of each other.

In some implementations, playing (504) the first media item includes pausing the first media item (and/or playing (505) the second media item includes pausing the second media item), where the second electronic device 502-2 is detected while the first media item is paused (and/or the first electronic device 502-1 is detected while the second media item is paused).

In some implementations, the first electronic device 502-1 pauses the first media item in response to detecting the second electronic device 502-2 in sufficient proximity to the first electronic device. Similarly, the second electronic device 502-2 may pause the second media item in response to detecting the first electronic device in sufficient proximity to the second electronic device).

The first electronic device 502-1 transfers (508) first contextual data of the first electronic device to the second electronic device 502-2, and the second electronic device 502-2 receives the first contextual data from the first electronic device, via the NFC channel. The first contextual data corresponds to the first media item.

In some implementations, the first contextual data specifies at least one of: a media-item identifier associated with the first media item (e.g., a unique ID for a music track); a time marker indicating a position within playback of the first media item (e.g., time marker 406-1 for the media item playing on the client device 102-1 in FIG. 4A is 3:15 for a track length of 6:53); a device identifier associated with the first electronic device (e.g., identifying information for the client device 102-1, such as a unique ID, a network address (IP address, MAC address), etc.); a user identifier associated with a user of the first electronic device (e.g., username, account name, etc.); or a media-item context indicating the playback context within which the first media item is played (e.g., media-item context 404-1 for client device 102-1 in FIG. 4A is the album "Dark Side of the Moon"). Playback context may indicate a predefined sequence of media items (e.g., a playlist, an album, etc., where media items have a defined order) or a type of relation of multiple media items (e.g., genre, artist, etc.).

In some implementations, the first electronic device transfers (508), and the second electronic device receives, the first contextual data in response to establishing (506) the NFC channel.

In some implementations, the first electronic device transfers (step 508), and the second electronic device receives, the first contextual data in response to the first and/or second electronic device detecting a user input authorizing the transfer of the first contextual data. The user input may, in some implementations, correspond to a selection of an affordance (e.g., user input 412 detected on affordance 410, FIG. 4C). Furthermore, in some implementations, the affordance is displayed on the first and/or second electronic device in response to establishing (506) the NFC channel.

In some implementations, the first electronic device 502-1 ceases to play the first media item (and/or the second electronic device 502-2 ceases to play the second media item) after the first and second electronic devices establish the NFC channel with each other. In some implementations, the first electronic device 502-1 ceases to play the first media item (and/or the second electronic device 502-2 ceases to play the second media item) in response to the first electronic device transferring (506) the first contextual data to the second electronic device, and the second electronic device receiving the first contextual data from the first electronic device. The two electronic devices thus may stop playing their current media items (e.g., their current tracks) when the NFC channel is established or when the contextual data is transferred.

In some implementations, the second electronic device 502-2 sends (510) to the remote server system 503, and the remote server system receives from the second electronic device, the first and second contextual data. The second contextual data of the second electronic device corresponds to the second media item (examples of contextual data are described above with respect to the first contextual data).

The remote server system 503 sends (512) to the first electronic device 502-1, and the first electronic device receives from the remote server system, a first playback command for the second media item in accordance with the second contextual data. Furthermore, the remote server system 503 sends (514) to the second electronic device 502-2, and the second electronic device receives from the remote server system, a second playback command for the first media item in accordance with the first contextual data. In response to receiving the first playback command for the second media item, the first electronic device 502-1 starts (516) playing the second media item. Furthermore, in response to receiving the second playback command for the second media item, the second electronic device 502-2 starts (518) playing the first media item. In some implementations, playback of swapped media items (e.g., swapped tracks) begins upon receiving the commands.

Figure 4D:
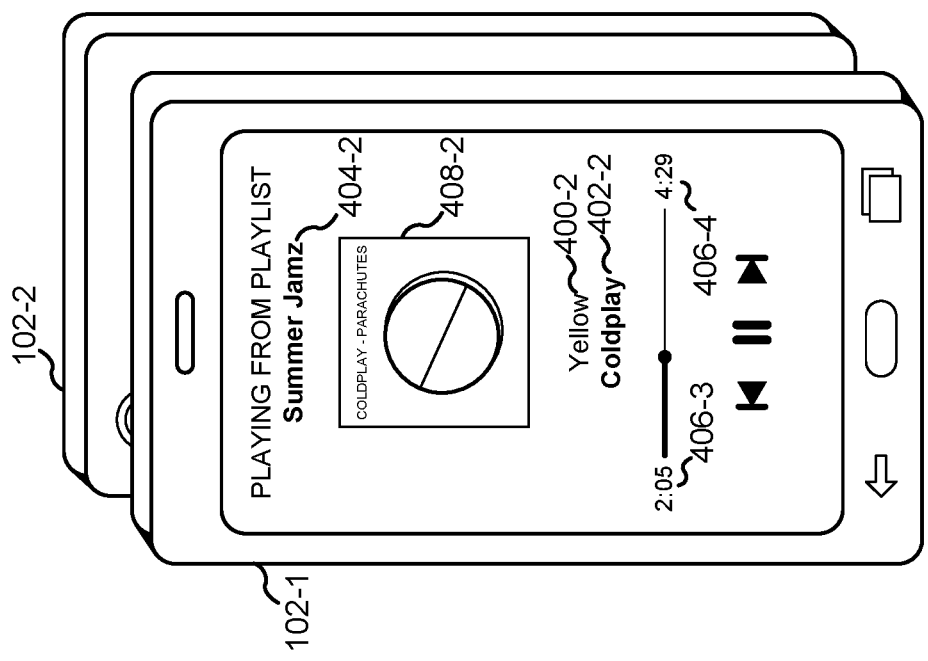
Figure 4E:
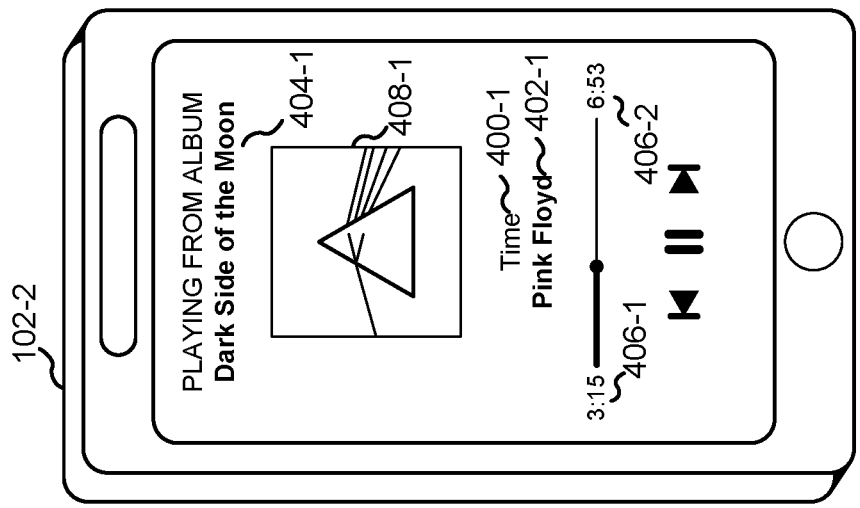
Figure 4E:
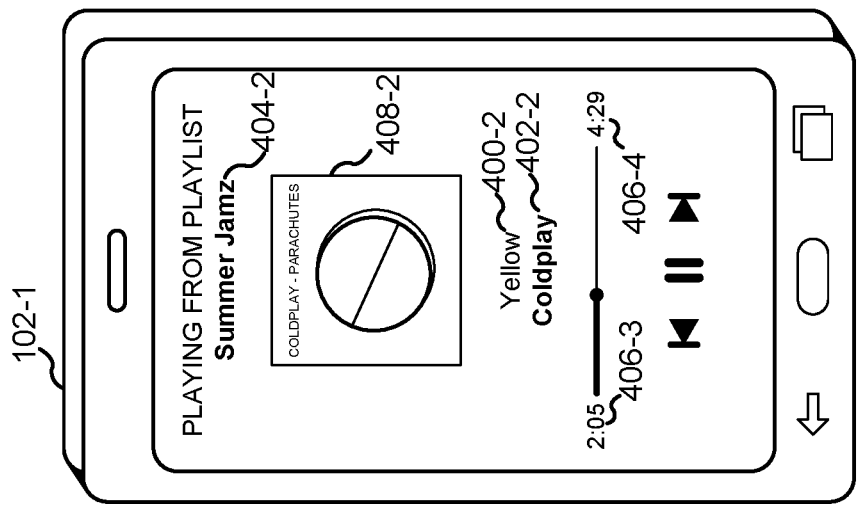

An example is illustrated in FIGS. 4C-4E. In FIG. 4C, upon detecting the user input 412 on the affordance 410, contextual data (e.g., media-item identifier, time marker, device identifier, etc.) is transferred from the client device 102-1 to the client device 102-2 using an NFC channel. As shown by the GUIs in FIGS. 4D and 4E, following the transfer of the contextual data, the client devices 102 switch contexts with each other (i.e., swap media items), resulting in each client device commencing playback of the media item that was previously being played on the other client device prior to the contextual data being transferred. Thus, contextual data for respective electronic devices may be used to identify media items in playback on the respective electronic devices (before or during the transfer of contextual data and/or the receipt of playback commands), and may be used (e.g., by a remote server system) to send corresponding commands to cause playback by each electronic device 502 of identified media items that were playing on the other electronic device 502.

In some implementations, playback commands are instructions that, when executed (e.g., by electronic devices that receive the playback commands), cause playback of corresponding media items to commence automatically (e.g., automatically begin streaming or downloading media content to an electronic device). In some implementations, a playback command is specific to a particular media item or playlist that includes the particular media item (based on information specified by contextual data transferred between electronic devices). In some implementations, the first playback command provides to the first electronic device 502-1 access to the second media item and/or the second playback command provides to the second electronic device 502-2 access to the first media item. For example, a playback command causes automatic playback of a media item. In other examples, a playback command causes display of a graphic associated with a media item (e.g., a track) and a selectable user-interface affordance for commencing playback of the media item.

In some implementations, the first electronic device 502-1 receives (516) the first playback command and/or the second electronic device 502-2 receives (518) the second playback command from the remote server system 503 to which the first contextual data of the first electronic device and second contextual data of the second electronic device are sent by the second electronic device. A single remote server thus controls the context switching. Alternatively, the playback commands are received from a server in communication with but distinct from the remote server system to which the first contextual data and the second contextual data are sent.

In some implementations, the first electronic device 502-1 receives the first playback command and/or the second electronic device 502-2 receives the second playback command from the remote server system 503 in response to the first and second contextual data being sent to the same remote server system 503. In alternative implementations, the second electronic device 502-2 sends either the first or second contextual data (but not both) to the remote server system 503. The first electronic device 502-1 then receives the first playback command for the second media item from the remote server system 503 in response to the second electronic device 502-2 sending the second contextual data, or the second electronic device receives the second playback command for the first media item from the remote server system in response to sending the first contextual data. Thus, in some implementations, only the first electronic device 502-1 or the second electronic device 502-2 switches context, but not both. The electronic device that switches context does so under the control of the remote server system 503.

In some implementations, the remote server system 503 previously provided to the first electronic device 502-1 a command to play (504) the first media item and/or that previously provided to the second electronic device 502-2 a command to play (505) the second media item. A single remote server system thus may control all playback operations.

In some implementations, the first electronic device 502-1 receives from the second electronic device 502-2, and the second electronic device sends to the first electronic device, the first playback command. In other words, the first playback command is sent directly by the second electronic device 502-2 to the first electronic device 502-1 without going through the remote server system 503. Similarly, the first electronic device 502-1 may send the second playback command directly to the second electronic device 502-2 without going through the remote server system 503. Context switching thus may occur independently of a remote server system.

In some implementations, the first electronic device 502-1 ceases to play the first media item after receiving the first playback command for the second media item (and/or the second electronic device 502-2 ceases to play the second media item after receiving the second playback command for the first media item). For example, the first electronic device 502-1 continues playing the first media item while the second electronic device 502-2 receives the first contextual data and sends the second contextual data to the remote server system 503, and continues playing the first media item until the remote server system 503 sends the first playback command to the first electronic device (or until the first electronic device receives the first playback command). The second electronic device 502-2 may operate similarly. The electronic devices may continue to play their original media items (e.g., tracks) until playback commands for the context switching are received.

In some implementations, the first electronic device 502-1 plays the second media item (step 516) after ceasing to play the first media item (and/or the second electronic device 502-2 plays the first media item (step 518) after ceasing to play the second media item). In other words, the first electronic device 502-1 ceases playback of the first media item first before it commences playback of the second media item.

In some implementations, the first electronic device 502-1 directly transitions to playing the second media item in response to the first command. Similarly, the second electronic device 502-2 directly transitions to playing the first media item in response to the second command. That is, in some implementations, the first electronic device 502-1 ceases to play the first media item upon receiving the first playback command for the second media item, and plays (516) the second media item upon ceasing to play the first media item. In addition, or alternatively, the second electronic device 502-2 ceases to play the second media item upon receiving the second playback command for the first media item, and plays (518) the first media item upon ceasing to play the second media item. Context switching thus may be almost immediate.

In alternative implementations, each electronic device finishes playing its current media item before switching context. The first electronic device 502-1 finishes playing the first media item before transitioning to playing the second media item and/or the second electronic device 502-2 finishes playing the second media item before transitioning to playing the first media item. The first electronic device 502-1 plays (516) the second media item after reaching the end of the first media item and ceasing to play the first media item. In addition, or alternatively, the second electronic device 502-2 plays (518) the first media item after reaching the end of the second media item and ceasing to play the second media item. Media items to be played in response to playback commands are thus placed in a playback queue.

An electronic device may finish playing its current playlist and/or start playing a playlist for the other device from the beginning. In some implementations, upon ceasing to play the first media item and before playing the second media item, the first electronic device 502-1 plays one or more additional media items distinct from the first and second media items. Similarly, upon ceasing to play the second media item and before playing the first media item, the second electronic device 502-2 may play one or more additional media items distinct from the first and second media items. The one or more additional media items to be played by one electronic device include media items in a playlist of the other electronic device as specified by contextual data for the other electronic device (e.g., the first electronic device 502-1 starts playing from the beginning of, or from another position within, a playlist of the second device in response to the playback command). Alternatively, or in addition, the one or more additional media items to be played by an electronic device include remaining media items in a current playlist of that electronic device. For example, the first electronic device finishes playing media items from its own playlist first before playing the second media item.

In other implementations, the second media item is preceded by additional media items in a predefined sequence of media items (e.g., a playlist), but the first electronic device 502-1 plays the second media item first upon ceasing to play the first media item. The first electronic device 502-1 thus does not begin from the beginning of the playlist of the second electronic device 502-2. Similarly, the first media item is preceded by additional media items in a predefined sequence of media items, but the second electronic device 502-2 plays the first media item upon ceasing to play the second media item. The second electronic device 502-2 thus does not begin from the beginning of the playlist of the first electronic device 502-1.

Context switching may involve swapping all or a portion of a playlist. In some implementations, after playing the second media item, the first electronic device 502-1 plays one or more additional media items distinct from the first and second media items, wherein the one or more additional media items follow the second media item in a playlist (e.g., a user playlist, an album, etc.) Likewise, after playing the first media item, the second electronic device 502-2 may play one or more additional media items distinct from the first and second media items, wherein the one or more additional media items follow the first media item in a playlist). If the one or more additional media items are the last media items in a sequence defined by the playlist, in some implementations, the first electronic device 502-1 plays another media item distinct from the first, second, and one or more media items, and corresponding to the beginning of the playlist (i.e., once the first electronic devices 502-1 reaches the end of a playlist that includes the second media item, it starts from the beginning of the playlist).

Playback of a swapped media item may be followed by playback of one or more media items that are similar or related. In some implementations, after playing the second media item, the first electronic device 502-1 plays one or more additional media items having a predefined association with the second media item (and/or after playing the first media item, the second electronic device 502-2 plays one or more additional media items having a predefined association with the first media item). The predefined association may be a common artist, music genre, or other shared characteristics (e.g., tempo, key, etc.).

In some implementations, when transitioning from playing one media item to playing another media item (e.g., the first electronic device 502-1 transitions from playing the first media item to playing the second media item), the first electronic device 502-1 and/or second electronic device 502-2 plays a transition effect (e.g., a gradual cross-fade, an audio gap, a sound effect, etc.).

In some implementations, playing (516) the second media item includes the first electronic device 502-1 commencing playback at a time marker of the second media item as specified in the first playback command (and/or playing (518) the first media item includes the second electronic device 502-2 commencing playback at a time marker of the first media item as specified in the second playback command). In some implementations, the time marker is a time specified by the corresponding contextual data.

The time marker may be the beginning of a corresponding media item. Alternatively, the time marker specifies a position within playback of the second media item (or the first media item, with respect to the second electronic device 502-2) that corresponds to a time at which the first contextual data was transferred (e.g., when the second electronic device 502-2 receives the first contextual data). In some implementations, the time marker specifies a position within playback of the second media item (or the first media item, with respect to the second electronic device 502-2) that corresponds to a time at which the second electronic device 502-2 ceases playback of the second media item (or a time at which the first electronic device 502-1 ceases playback of the first media item). In some implementations, the time marker corresponds to a time at which the second electronic device 502-2 sends (510) the second contextual data to the remote server system 503 (step 510). In some implementations, the time marker corresponds to a time when the NFC channel is established.

Context switching may involve swapping graphics associated with media items (e.g., album-cover images associated with tracks). In some implementations, the first electronic device 502-1 displays a first graphic associated with the first media item while playing (504) the first media item (and/or the second electronic device 502-2 displays a second graphic associated with the second media item while playing (505) the second media item. The first electronic device 502-1 ceases to play the first media item after receiving the first playback command for the second media item (and/or the second electronic device 502-2 ceases to play the second media item after receiving the second playback command for the first media item). Concurrently with ceasing to play the first media item, the first electronic device 502-1 ceases to display the first graphic (and/or concurrently with ceasing to play the second media item, the second electronic device 502-2 ceases to display the second graphic). Furthermore, the first electronic device 502-1 displays the second graphic associated with the second media item while playing the second media item (and/or the second electronic device 502-2 displays the first graphic associated with the first media item while playing the first media item). An example is shown in FIGS. 4A and 4E, where FIG. 4A illustrates GUIs displayed on the client devices 102 before, and FIG. 4E illustrates GUIs displayed on the client devices 102 after, performing a process for media context switching.

The second electronic device 502-2 may sometimes receive contextual data at different times from multiple electronic devices, where media items corresponding to the received contextual data are queued for playback. Here, the second electronic device 502-2 may be a media presentation system 108, such as a jukebox sound system that is accessible by multiple users. In these implementations, while playing a media item (e.g., the second media item, or the first media item, if the second playback command has already been received), the second electronic device 502-2 establishes a second NFC channel with a third electronic device (e.g., a client device 102) while the third electronic device is playing a third media item. The second electronic device 502-2 receives third contextual data via the second NFC channel from the third electronic device, wherein third contextual data of the third electronic device corresponds to the third media item. After receiving the third contextual data, the second electronic device 502-2 receives a third playback command for the third media item. After receiving the third playback command for the third media item, the second electronic device 502-2 plays the third media item. In some implementations, the first NFC channel is established (506) with the first electronic device 502-1 (and then broken when the devices are separated) before establishing the second NFC channel with the third electronic device, and the second electronic device 502-2 plays the third media item after playing (518) the first media item. Thus, the second electronic device 502-2 manages a queue of media items for playback, and plays media items in the order in which contextual data is exchanged, or playback commands are received.

Although some of various drawings illustrate a number of logical stages in a particular order, stages which are not order dependent may be reordered and other stages may be combined or broken out. Furthermore, in some implementations, some stages may be performed in parallel and/or simultaneously with other stages. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
at a first electronic device associated with a first user, the first electronic device having one or more processors and memory storing instructions for execution by the one or more processors:
while playing a first media item, establishing a wireless communication channel with a second electronic device, wherein the second electronic device is distinct from the first electronic device and associated with a second user distinct from the first user;
transferring, from the first electronic device, first contextual data of the first electronic device via the wireless communication channel, wherein the first contextual data indicates a first predefined sequence of media items that includes the first media item;
receiving, from the second electronic device, second contextual data of the second electronic device via the wireless communication channel, wherein the second contextual data indicates a second predefined sequence of media items that includes a second media item that is currently playing on the second electronic device;
receiving a playback command, at the first electronic device, for the second media item currently playing on the second electronic device; and
in response to receiving the playback command for the second media item, playing one or more media items from the second predefined sequence of media items and the second media item at the first electronic device without additional user input at the first electronic device.

2. The method of claim 1, wherein the playback command is received from a remote server system, distinct from the first and second electronic devices, to which the first contextual data of the first electronic device and the second contextual data of the second electronic device are sent by the first electronic device.

3. The method of claim 1, wherein the playback command is received from a remote server system, distinct from the first and second electronic devices, that previously provided to the first electronic device a command to play the first media item.

4. The method of claim 1, wherein the playback command for the second media item currently playing on the second electronic device is received after the first contextual data is transferred to the second electronic device.

5. The method of claim 1, further comprising swapping contextual data of respective media items playing at the first and second electronic devices, wherein the swapping includes:
receiving, from the second electronic device, the second contextual data of the second electronic device via the wireless communication channel;

transferring, from the first electronic device, the first contextual data corresponding to the first media item to the second electronic device;

receiving the playback command, at the first electronic device, for the second media item currently playing on the second electronic device; and playing the second media item at the first electronic device without additional user input at the first electronic device.

6. The method of claim 1, wherein the playback command is received from the second electronic device.

7. The method of claim 1, wherein the second contextual data of the second electronic device specifies at least one of:

a device identifier associated with the second electronic device; and a user identifier associated with a user of the second electronic device.

8. The method of claim 1, wherein:

playing the second media item includes pausing the first media item; and the second electronic device is detected while the first media item is paused.

9. The method of claim 1, further comprising pausing the first media item in response to detecting the second electronic device in sufficient proximity to the first electronic device.

10. The method of claim 1, wherein receiving the second contextual data of the second electronic device is performed in response to establishing the wireless communication channel.

11. The method of claim 1, further comprising ceasing to play the first media item in response to receiving the second contextual data of the second electronic device.

12. The method of claim 1, further comprising ceasing to play the first media item after receiving the playback command for the second media item.

13. The method of claim 12, wherein the second media item is played after ceasing to play the first media item.

14. The method of claim 13, wherein ceasing to play the first media item corresponds to reaching an end of the first media item.

15. The method of claim 12, further comprising, upon ceasing to play the first media item and before playing the second media item:

playing one or more additional media items distinct from the first and second media items.

16. The method of claim 1, further comprising, after playing the second media item, playing one or more additional media items having a predefined association with the second media item.

17. The method of claim 1, wherein playing the second media item comprises commencing playback at a time marker of the second media item as specified in the playback command.

18. The method of claim 17, wherein the time marker specifies a position within playback of the second media item that corresponds to a time at which the second contextual data of the second electronic device was received.

19. A first electronic device associated with a first user, comprising:

one or more processors; and memory storing one or more programs for execution by the one or more processors, the one or more programs including instructions for:

while playing a first media item, establishing a wireless communication channel with a second electronic device, wherein the second electronic device is distinct from the first electronic device and associated with a second user distinct from the first user;

transferring, from the first electronic device, first contextual data of the first electronic device via the wireless communication channel, wherein the first contextual data indicates a first predefined sequence of media items that includes the first media item;

receiving, from the second electronic device, second contextual data of the second electronic device via the wireless communication channel, wherein the second contextual data indicates a second predefined sequence of media items that includes a second media item that is currently playing on the second electronic device;

receiving a playback command, at the first electronic device, for the second media item currently playing on the second electronic device; and in response to receiving the playback command for the second media item, playing one or more media items from the second predefined sequence of media items and the second media item at the first electronic device without additional user input at the first electronic device.

20. A non-transitory computer-readable storage medium storing one or more programs for execution by one or more processors of a first electronic device associated with a first user, the one or more programs including instructions for:

while playing a first media item, establishing a wireless communication channel with a second electronic device, wherein the second electronic device is distinct from the first electronic device and associated with a second user distinct from the first user;

transferring, from the first electronic device, first contextual data of the first electronic device via the wireless communication channel, wherein the first contextual data indicates a first predefined sequence of media items that includes the first media item;

receiving, from the second electronic device, second contextual data of the second electronic device via the wireless communication channel, wherein the second contextual data indicates a second predefined sequence of media items that includes a second media item that is currently playing on the second electronic device;

receiving a playback command, at the first electronic device, for the second media item currently playing on the second electronic device; and in response to receiving the playback command for the second media item, playing one or more media items from the second predefined sequence of media items and the second media item at the first electronic device without additional user input at the first electronic device.

21. The method of claim 1, wherein the one or more media items from the second predefined sequence of media items are played at the first electronic device after playback of the second media item.

* * * * *